(No Model.)  2 Sheets—Sheet 1.

J. HUNKELER.
FLY TRAP.

No. 433,348. Patented July 29, 1890.

WITNESSES
Edward W. Furrele

INVENTOR
Joseph Hunkeler
by C. D. Moody
his atty

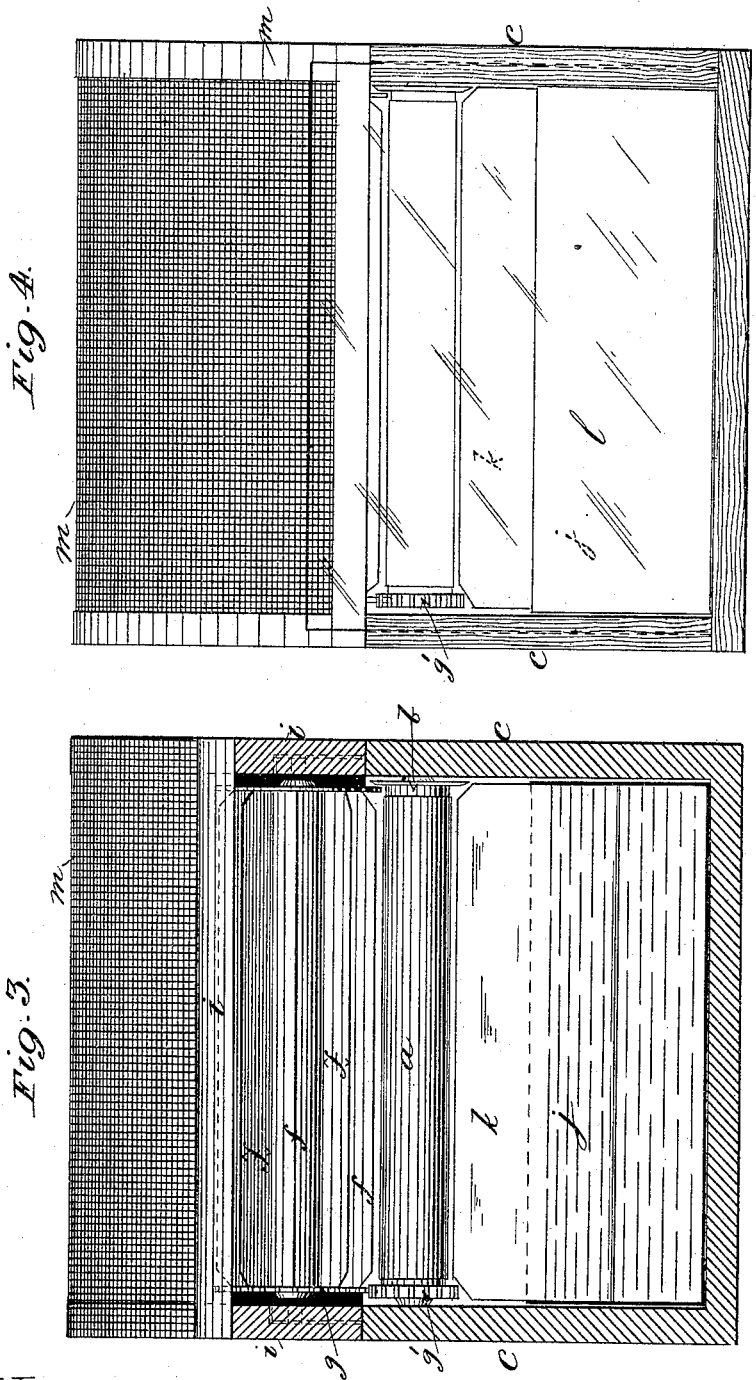

UNITED STATES PATENT OFFICE.

JOSEPH HUNKELER, OF ST. LOUIS, MISSOURI; JOSEPH HUNKELER, JR., ADMINISTRATOR OF SAID JOSEPH HUNKELER, DECEASED.

FLY-TRAP.

SPECIFICATION forming part of Letters Patent No. 433,348, dated July 29, 1890.

Application filed May 1, 1890. Serial No. 350,191. (No model.)

*To all whom it may concern:*

Be it known that I, JOSEPH HUNKELER, a citizen of the United States, residing at St. Louis, in the State of Missouri, have invented a new and useful Improvement in Fly-Traps, of which the following is a full, clear, and exact description.

My invention relates to an improved device for trapping and destroying flies or other insects in a cleanly and inoffensive manner; and it consists in an endless traveling apron or band by which the flies on alighting thereon are conveyed into a chamber to which light is admitted, the said chamber being closed to the egress of the flies and located over a vessel containing water or other suitable liquid or material, combined with features of novelty, as hereinafter described and claimed.

Figure 1:
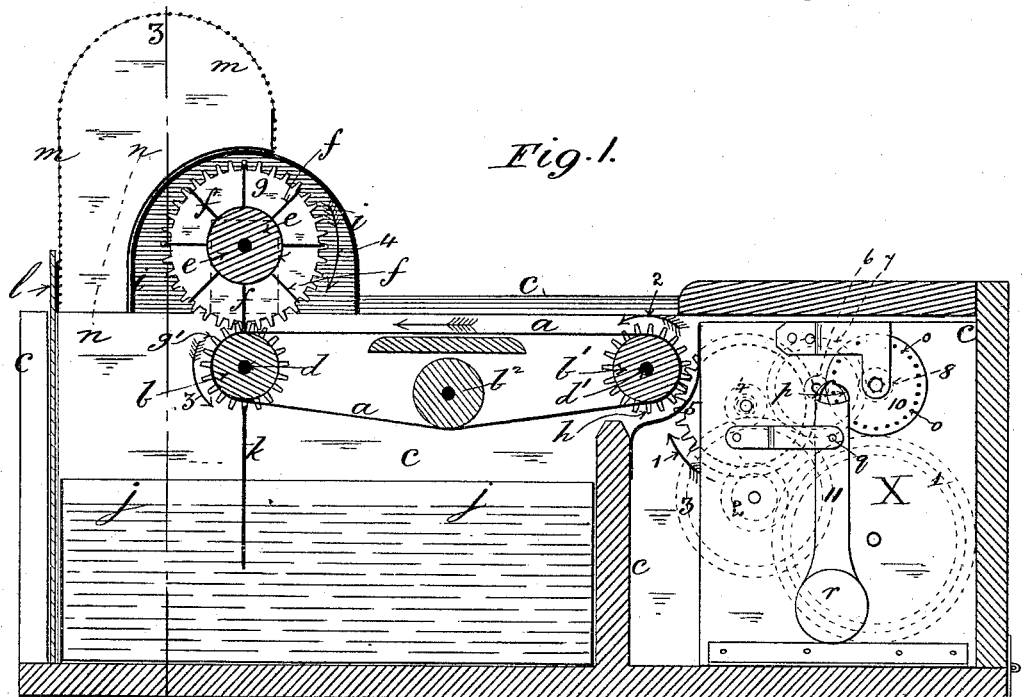
Figure 2:
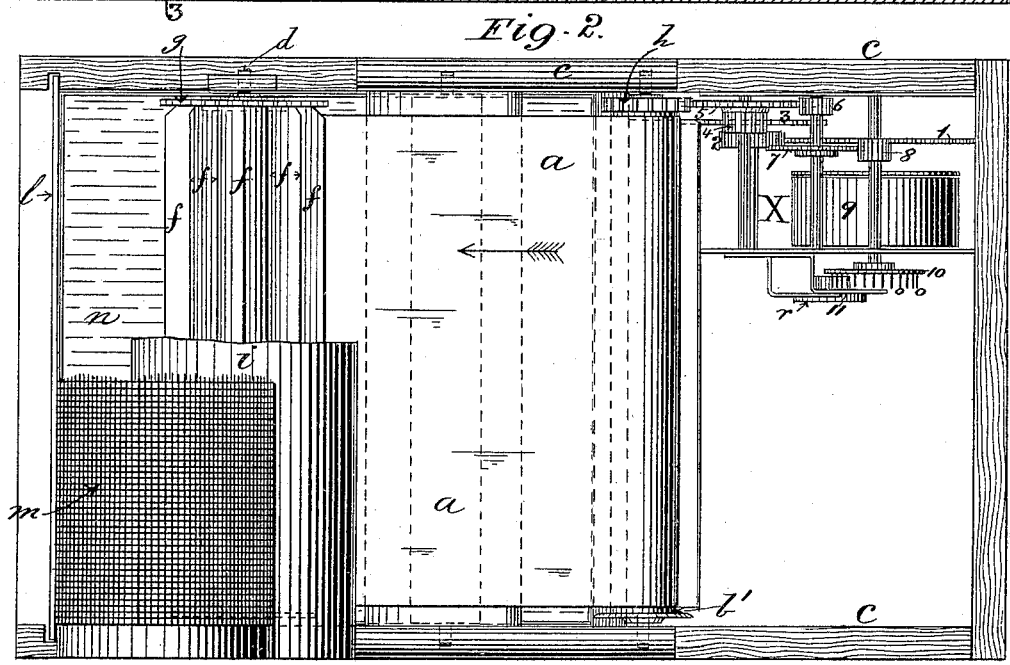

In the accompanying drawings, Figure 1 represents a longitudial sectional elevation of my improved fly-trap; Fig. 2, a plan thereof, partly broken away; Fig. 3, a transverse section on line 3 3 in Fig. 1; and Fig. 4, a front end elevation of the trap, looking from the left of Fig. 1—like letters of reference denoting like parts in all the figures.

$a$ represents an endless apron or band, which is passed over rollers $b$ $b'$, arranged horizontally and parallel to each other at suitable distances apart between the sides of a box or case $c$, which is open at the top, where the upper part of the band $a$ is exposed for enabling the flies to alight thereon, the band $a$ being preferably equal in width to the length of the rollers $b$ $b'$, or thereabout.

The rollers $b$ $b'$ are provided, respectively, with spindles or axles $d$ $d'$, which have their bearings in the sides of the box $c$.

For maintaining the band $a$ in a taut condition it may be passed over a roller $b^2$, mounted on its spindle between the sides of the box $c$ in a similar manner and intermediate to the rollers $b$ $b'$; but this roller $b^2$ may in some cases be dispensed with.

Above and parallel to the roller $b$ is a roller $e$, (or axle,) having its bearings in the sides of the box $c$. Longitudinally on the roller $e$ (or axle) are fixed the inner edges of wings or blades $f$, which project radially to an equal extent from the circumference of the roller $e$, (or axle,) which is so located relatively to the spindle $d$ of the roller $b$ that on rotation being imparted to the roller $e$ the outer edges of the wings or blades pass successively in close proximity to the upper surface of the band $a$. At the end of the roller $e$ (or axle) is fixed a toothed spur-wheel $g$, which is engaged by a toothed spur-wheel $g'$, fixed at the end of the roller $b$ or on the spindle $d$ adjacent to the roller $b$, the roller $b'$ being provided with a similar toothed wheel $h$, which is engaged by the toothed wheel 5 of a train of geared wheels and pinions 1 to 8, which are actuated by the spring 9 and provided with a specially-devised escapement 10 11, as hereinafter more particularly referred to, the entire clock-work X being suitably located and fixed within the box $c$.

Over the roller $e$, with its wings or blades $f$ and toothed wheel $g$, is placed a hood or covering $i$, which extends entirely across the top of the box $c$, and is so shaped internally that the wings or blades $f$ are in close proximity to the highest portion of the roof of the hood $i$ at all times.

In the box $c$, beneath the endless band $a$ and for a suitable distance beyond or in front of the delivery-roller $b$, is placed a tank or vessel $j$ containing water or other liquid and having a transverse partition $k$, which extends upward to within the shortest possible distance from the roller $b$ and downward beneath the surface of the water to within a suitable distance of the bottom of the tank $j$, so that the water, combined with the partition $k$, rollers $b$ and $e$, wings or blades $f$, and hood $i$, form a practically-closed screen across the box $c$ between the exposed portion of the endless band $a$ and those portions of the box $c$ and tank $j$ lying beyond or in front of the delivery-roller $b$, this said front portion of the box $c$ being closed at the end by a sliding or removable glass plate $l$.

Across the open top of the box $c$, immediately over the front portion of the tank $j$ and between the hood $i$ (which it overlaps) and glass plate $l$, is placed a hood $m$, composed of wire-gauze or other suitable material pervious to light, whereby a light-chamber $n$ is formed between the hood $m$, glass plate $l$, and water-tank $j$ in front of the delivery-roller $b$.

In operation, the clock-work X being set in motion and the toothed wheel 5 rotated in the direction of arrow 1, the toothed wheel $h$ is thereby rotated in the direction of arrow 2, carrying with it the roller $b'$, which causes the top part of the endless band $a$ to travel toward the front end of the box $c$ and rotate the toothed wheel $g'$ in the direction of arrow 3, which rotates the toothed wheel $g$ and wings or blades $f$ in the direction of arrow 4. Meanwhile the flies or other insects, alighting on the exposed portion of the endless band $a$, which has been previously partially covered with molasses or other material attractive to flies, are conveyed by the traveling band $a$ and delivered beneath the revolving wings or blades $f$ and over the delivery-roller $b$ into the light-chamber $n$, where, attracted by the light entering through the glass plate $l$ and hood $m$, and not being able to return past the delivery-roller $b$ and adjacent parts constituting the closed screen, as before recited, speedily become exhausted and fall into the water contained in the tank $j$, which, on withdrawing the glass plate $l$, may be removed as often as desired for cleaning purposes. The hoods $m$ and $i$ are also removable at pleasure.

The escapement which I preferably employ for the clock-work X consists of the wheel 10, which is fixed on the outer end of the spindle carrying the toothed pinion 8, and is provided with a series of equidistant pins or pegs $o$, which project at right angles from the face of the wheel 10 concentrically to the said spindle. These pins $o$ are engaged successively by each of two hook-shaped escapement-catches $p$, carried at the upper end of the pendulum-lever 11, (of the first order,) which is pivoted at $q$ to the clock-frame and provided at its lower free end with a bob $r$, so that on vibration being imparted to the pendulum 11 the wheel 10 is allowed to rotate to an extent corresponding to the distance between two consecutive pins $o$ on the alternate escape therefrom of each catch $p$ during each vibration of the pendulum-lever 11 to and fro.

I claim as my invention—

1. In a device for trapping flies or other insects, the combination, with a tank or vessel for containing water or other liquid or material, of an endless traveling band carried by rollers and spindles, one of said rollers having a toothed wheel gearing into a toothed wheel on a roller (or axle) having wings or blades, the said endless band communicating with a chamber to which light is admitted and which is closed to the egress of the flies, substantially as shown and described.

2. In a device for trapping flies, the combination, with a light-chamber having a tank or vessel for containing water or other liquid or material, of an endless traveling band carried by rollers and spindles, one of said rollers having a toothed wheel gearing into a toothed wheel on a roller (or axle) having wings or blades, substantially as shown and described.

3. The combination of an endless apron or band $a$, carried by rollers $b$ $b'$, having spindles $d$ $d'$ and toothed wheels $g'$ $h$, respectively, the said spindles $d$ $d'$ being mounted in bearings within a box or case $c$, roller (or axle) $e$, having toothed wheel $g$, and wings or blades $f$, hood or covering $i$, and light-chamber $n$, said chamber $n$ being preferably composed of a wire-gauze hood $m$ and glass plate $l$, with clock-work X, and a tank or vessel $j$ for containing water or other liquid or material, substantially as shown, and for the purpose described.

JOSEPH HUNKELER.

Witnesses:
C. D. MOODY,
GEO. WINZER.